(12) United States Patent
Pryor

(10) Patent No.: US 6,388,366 B1
(45) Date of Patent: May 14, 2002

(54) CARBON NITRIDE COLD CATHODE

(75) Inventor: Roger W. Pryor, Bloomfield Hills, MI (US)

(73) Assignee: Wayne State University, Detroit, MI (US)

(*) Notice: Subject to any disclaimer, the term of this patent is extended or adjusted under 35 U.S.C. 154(b) by 0 days.

(21) Appl. No.: 08/438,118

(22) Filed: May 8, 1995

(51) Int. Cl.[7] .................................................. C01L 3/00
(52) U.S. Cl. ..................... 313/311; 313/310; 313/346 R; 313/495; 423/384; 423/275; 423/265
(58) Field of Search ................................ 423/275, 265, 423/384, 366, 367, 368, 408, 688; 204/280; 313/310, 311, 346 R, 495; 429/218, 231.8

(56) References Cited

U.S. PATENT DOCUMENTS

| | | | |
|---|---|---|---|
| 3,612,941 A | 10/1971 | Nablo et al. ................. 313/310 |
| 4,683,043 A | 7/1987 | Melton et al. ......... 204/192.15 |
| 4,875,943 A | * 10/1989 | Hanakawa et al. ......... 136/244 |
| 4,926,437 A | 5/1990 | Ford ........................... 327/87 |
| 5,110,679 A | 5/1992 | Haller et al. ................ 428/408 |
| 5,227,318 A | 7/1993 | Doll et al. .................... 437/87 |
| 5,330,611 A | 7/1994 | Doll ............................ 177/105 |
| 5,371,382 A | 12/1994 | Venkatesan et al. .......... 257/77 |
| 5,405,515 A | 4/1995 | Fang .......................... 204/164 |
| 5,442,255 A | * 8/1995 | Ise et al. ..................... 313/309 |
| 5,483,118 A | * 1/1996 | Nakamoto et al. .......... 313/309 |

* cited by examiner

*Primary Examiner*—Stuart L. Hendrickson
(74) *Attorney, Agent, or Firm*—Dykema Gossett PLLC

(57) ABSTRACT

A cold cathode is formed of carbon nitride. The cathode may include layers of boron nitride and diamond underlying the carbon nitride. The cathodes are made by reactive laser ablation or by sputtering. Electronic devices utilizing the carbon nitride cathodes are also described.

17 Claims, 2 Drawing Sheets

CARBON NITRIDE COLD CATHODE

FIELD OF THE INVENTION

The present invention generally relates to electron emitter materials and more specifically provides a new class of electron emitter devices based on carbon nitride.

BACKGROUND OF THE INVENTION

Carbon nitride (CN) has been investigated due to its potential as an industrial material due to a number of predicted desirable properties, including hardness. Carbon nitride exists in several crystalline structures. The structure of a carbon nitride film may run from amorphous to polycrystalline to single crystal.

In U.S. Pat. No. 5,405,515, "METHOD AND APPARATUS FOR PRODUCTION OF A CARBON NITRIDE FILM," a method of forming carbon nitride films based on a combination of a carbon arc and a nitrogen plasma is disclosed. The material is described as useful in applications where superior surface hardness is required.

In U.S. Pat. No. 5,110,679, crystalline carbon nitride films are disclosed which are fabricated by sputtering from a carbonaceous target in the presence of a nitrogen atmosphere onto a single crystal silicon or germanium substrate. It is disclosed that carbon nitride may be used as a high temperature structural material with good strength-to-weight ratios.

Cathodes are used in a number of electronic devices such as displays, power amplifiers and vacuum microelectronics. Conventional cathode structures are relatively low current devices which require either high extraction voltages or elevated temperatures for operation. Accordingly, it would be desirable to provide a cold cathode which would function at lower temperatures and voltages than existing cathodes.

It is an object of the present invention to provide a cold cathode material which is capable of producing large currents at relatively low applied fields and at nominally ambient temperature.

It is another object of the present invention to provide microelectronic devices having a cathode structure fabricated of carbon nitride.

It is yet another object of the present invention to provide such cold cathode materials which can be fabricated by reactive laser ablation, chemical vapor deposition or sputtering processes.

SUMMARY OF THE INVENTION

In accordance with the present invention, a cold cathode material is provided which comprises carbon nitride. The carbon nitride cold cathodes of the invention may be amorphous carbon nitride, polycrystalline carbon nitride or single crystal carbon nitride. The cold cathodes of the present invention may comprise mixed forms of the various phases of carbon nitride. The carbon nitride cold cathodes of the invention may be operated at temperatures as low as 20° C. with extraction voltages of as low as $10^{-2}$ volts/$\mu$m. They are capable of producing currents as high as 100 amperes/cm$^2$.

In another aspect the present invention provides a new class of electronic devices in which the cathode material is carbon nitride. These devices include lamps, flat panel displays, power amplifiers, vacuum microelectronics, radiation hard computers and transient suppression devices and the like.

In still another aspect, the cold cathodes of the invention are composite structures of carbon nitride, boron nitride and diamond. A diamond layer is created by microwave or some other type of CVD which serves as a substrate on which a thin boron nitride layer is deposited. A carbon nitride layer is then formed on the boron nitride layer. The boron nitride layer and the diamond layer are doped n-type.

In still another aspect the cold cathodes of the invention are free-standing structures of carbon nitride.

In still another aspect the invention provides methods for fabricating carbon nitride cold cathodes by laser ablation deposition utilizing a reactive biased laser ablation technique in which the surface of a silicon substrate is first pretreated with atomic hydrogen and then irradiated with a laser plume energized by at least one biased ring. A doped cubic boron nitride layer is preferably first deposited under biased conditions in an argon/nitrogen, dopant/nitrogen/argon or dopant/nitrogen atmosphere. A carbon nitride layer is then formed on the boron nitride layer under biased conditions in a nitrogen/argon or nitrogen, argon, carbon-bearing gas (CH$_4$ etc.) atmosphere. The carbon nitride surface layer is then annealed with an atomic hydrogen plasma.

In still another embodiment the carbon nitride cold cathodes of the invention are formed using a reactive sputtering process. Sputtering is carried out by magnetron sputtering deposition using a carbon target in a nitrogen or nitrogen argon, or nitrogen, argon, carbon-bearing gas (CH$_4$ etc.) atmosphere.

Other objects, features and advantages of the present invention will become apparent upon consideration of the specification and the appended drawings.

DETAILED DESCRIPTION OF THE PREFERRED EMBODIMENTS

In the present invention carbon nitride is used as a material to fabricate cold cathodes which are of particular use in microelectronic devices. The carbon nitride cold cathodes of the present invention are capable of producing current under low extraction voltages at ambient temperatures. In one preferred embodiment the cold cathodes of the present invention produced up to 0.12 A/cm$^2$ at a field of about 60 V/$\mu$m when the cathode temperature was at 20° C. The ability to produce relatively high currents at modest voltages without the need to heat the cathode material makes the cathodes of the present invention highly desirable in microelectronic devices.

Figure 1:
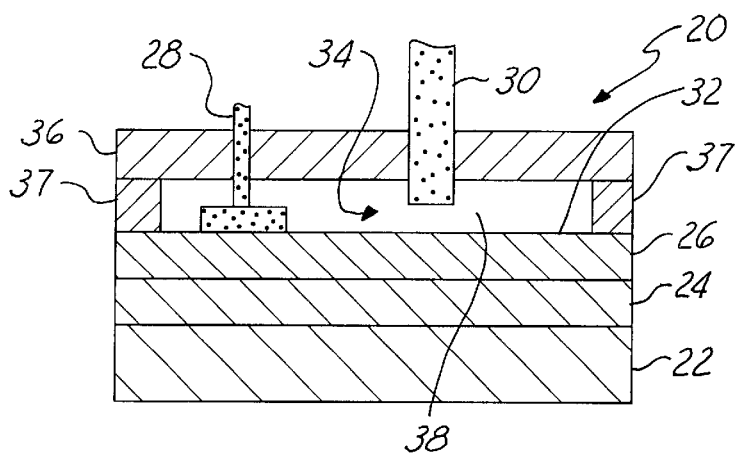
FIG. 1 is a front elevational cross-section of a microelectronic device made in accordance with the present invention.

Referring now to FIG. 1 of the drawings, microelectronic device 20 is shown having a silicon substrate 22 on which an n-type diamond layer 24 is disposed. Overlying diamond layer 24, n-type boron nitride layer 26 is provided in one embodiment of the invention. Overlying boron nitride layer 26, carbon nitride layer 27 is provided which functions as an electron emitter. Electrode 28 is in ohmic contact with carbon nitride layer 27. Electrode 30 is spaced a predetermined distance from principal surface 32 to create gap 34. Electrodes 28 and 30 are preferably formed of tungsten; other metals such as nickel may be suitable. Dielectric layer 36 and dielectric spacers 37 are provided which may be glass or quartz or most other dielectric materials. A nylon material known as "Delrin" is also suitable. Electrodes 28 and 30 extend through layer 36. In this particular embodiment device 20 is a vacuum diode and, accordingly, the various layers create an hermetically sealed chamber 38. It is to be understood that the thin film fabrication techniques utilized to form device 20 will be understood by those skilled in the art based on the teachings herein and that it is the use of carbon nitride to form the cold cathode structure which is novel. It is intended that numerous other microelectronic devices which utilize cathodes such as triodes, pentodes, magnetrons, flat panel displays and voltage regulators, photomultipliers and the like may be fabricated using carbon nitride as the cathode material based on the teachings of the present invention. Thus, the present invention in one aspect is directed to an entire class of electronic devices based on the discovery of carbon nitride as a cold cathode.

Referring again to FIG. 1 of the drawings, upon application of an appropriate voltage across electrodes 28 (negative polarity) and 30 (positive polarity), carbon nitride layer 27 emits electrons across gap 34 to electrode 30 to complete the circuit. It will be appreciated that diode 20 may be used in a number of applications such as current rectification or the like.

Silicon layer 22 is preferably doped n-type and functions as a support structure for the overlying layers in device 20 as well as during fabrication. It may be suitable to eliminate layer 22 in some applications. In device 20, layer 22 will typically be between from about 250 to about 750 microns thick or greater and will preferably be single crystal silicon doped with a suitable n-type dopant such as phosphorous or arsenic or antimony to a concentration of from about $10^{16}$ $cm^3$ to about $10^{21}$ $cm^3$.

Diamond layer 24 serves as an electrical conductor as well as a heat sink for device 20 and provides physical support for the overlying layers. Diamond layer 24 is made synthetically through a deposition process, preferably CVD, by ionization of a carbon feed-stock gas. One suitable approach for fabricating diamond layer 24 is disclosed in Applicant's co-pending U.S. patent application Ser. No. 718,308, "Homoepitaxial Growth of Large Area Diamond Sheets," the entire disclosure of which is incorporated herein by reference. Therein, a method of depositing diamond on a silicon substrate is disclosed which uses microwave assisted CVD. Although diamond layer 24 may be single crystal material, polycrystalline diamond may be used. Diamond layer 24 is preferably from about 1 to about 200 microns thick and is doped n-type with a suitable dopant (as listed previously) to a concentration of from about $10^{16}$ $cm^3$ to $10^{22}$ $cm^3$. It is most preferred that the n-type dopant be added to the diamond material during the CVD process by including a phosphorus containing gas in the deposition chamber.

A thin boron carbon nitride layer 26 is preferably formed on diamond layer 24 but may be preferably omitted in specific applications of the invention. Boron nitride layer 26 serves as a bonding layer between carbon nitride layer 27 and diamond layer 24. Neither boron nitride layer 26 and diamond layer 24 nor carbon nitride layer 27 and boron nitride layer 26 need to be heteroepitaxial. Boron nitride layer 26 is preferably polycrystalline boron nitride and most preferably n-type cubic boron nitride, although other crystalline forms, including single crystal or amorphous boron nitride, may be suitable in some applications. Boron nitride layer 26 is preferably from about 0.1 to about 1000 nm thick and more preferably from about 1 to about 50 nm thick in device 20. Boron nitride layer 26 is doped n-type to a concentration of from about $10^{16}$ $cm^3$ to about $10^{22}$ $cm^3$ more preferably from about $10^{17}$ $cm^3$ to about $10^{19}$ $cm^3$. Suitable n-type dopants are carbon, lithium and sulfur. The most preferred form of boron nitride and its method of fabrication in forming boron nitride layer 26 is described in my co-pending U.S. application Ser. No. 411,249, filed Mar. 27, 1995, "Boron Nitride Cold Cathode," the entire disclosure of which is incorporated herein by reference. Methods of laser ablation and magnetron sputtering deposition of boron nitride films are described therein.

Overlying boron nitride layer 26, carbon nitride layer 27 is formed which provides the numerous advantages of the present invention, i.e. high currents at low extraction voltages and ambient temperatures. Accordingly, although it is preferred that all four layers, carbon nitride layer 27, boron nitride layer 26, diamond layer 24 and silicon support layer 22 be provided, it may be suitable in some applications to eliminate silicon layer 22, diamond layer 24, boron nitride layer 27 or some or all of these layers. It may also be suitable to use different support layers, or, in some applications, to eliminate all supporting layers post-deposition, for example using an appropriate etchant or micro-machining technique to fabricate carbon nitride as a free-standing cathode. Carbon nitride layer 27 is preferably from about 0.1 to about $10^5$ nm thick and more preferably from about 0.1 to about 100 nm thick in device 20. The size of the carbon nitride layer will be dictated in part by the particular application. It will be appreciated that carbon nitride layer 27 will be intrinsically conductive. In some applications, however, carbon nitride layer 27 may be doped n-type to a concentration of about $10^{16}$ $cm^3$ to about $10^{22}$ $cm^3$ and more preferably from about $10^{17}$ $cm^3$ to about $10^{19}$ $cm^3$. Suitable dopants are C, N, P and Si. C is a particularly preferred dopant for carbon nitride layer 26. The preferred doping is in situ doping, i.e., the doping occurs as the layer is formed. Other dopant methods may be suitable.

Carbon nitride layer 27 may be single crystal, amorphous or polycrystalline. It may be a single type of crystalline structure or a combination of crystalline structures or allotropes and phases. It is preferred that the polycrystalline carbon nitride of the present invention have an average grain size of from about 0.01 to about 1000 microns and a range of grain sizes of from about 0.001 to about $10^4$ and more preferably from 0.1 to 200 microns with a range of grain sizes of from 0.1 to 200.

One preferred method for forming carbon nitride layer 27 is through the use of reactive laser ablation deposition. After preparation of the substrate layers and any necessary masking or the like, and referring now to FIG. 2 of the drawings, substrate 40 is placed in position for deposition of carbon nitride layer 27. Laser deposition is preferably carried out after first creating an n-type diamond layer on a silicon substrate. The polycrystalline carbon nitride layer 27 is formed in the presence of a nitrogen-containing atmosphere e.g., a nitrogen or nitrogen/argon atmosphere, preferably in the range between 1–100 millitorr, and more preferably in the range between 15–50 millitorr. The volumetric ratio of nitrogen to argon is from about 4:1 to about 1:4. By depositing the carbon nitride at temperatures below about 600° C. and preferably between about 300° C. to 500° C., polycrystalline carbon nitride forms. Ionized nitrogen formed during reactive laser ablation helps maintain the stoichiometry of the carbon nitride layer.

Figure 2:
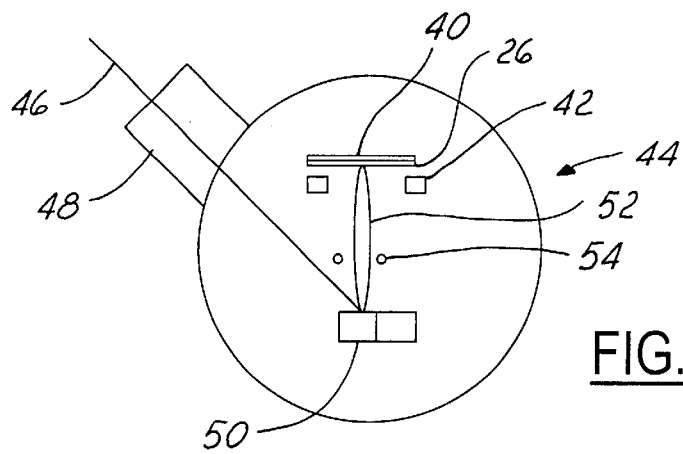
FIG. 2 is a schematic view of a reactive, biased laser ablation deposition apparatus.

The diamond substrate surface on which the substrate boron nitride layer 26 is deposited should be cleaned prior to the deposition process to remove possible contaminants. Diamond layer 24 is preferably polycrystalline diamond. A conventional cleaning technique such as an ethanol wash may be used. One preferred cleaning technique is a hydrogen plasma etching directly in the laser ablation chamber to remove any residual contamination. This cleaning technique employs atomic hydrogen injectors 42 as shown in FIG. 2. By the in situ cleaning of a diamond surface in the laser ablation chamber, the possibility of contamination during thin film growth is minimized.

In forming carbon nitride layer 27 by the preferred layer ablation method, reaction chamber 44 is provided into which a pulsed excimer laser beam 46 is introduced through a laser entry port 48. Upon entering reaction chamber 44, the excimer laser beam 46 which is focused with appropriate lenses (not shown) impinges upon the rotating ablation target 50. Target 50 is connected to a motor (not shown) whereby the target can be rotated. By adjusting the speed of rotation and the pulse rate of laser beam 46, the portion of target 50 that beam 46 strikes can be controlled. In one preferred embodiment, target 50 is a split target of hexagonal boron nitride and carbon. The target is rotated to first form a thin n-type (carbon doped) boron nitride layer 26 and is then stopped at the carbon half of the target such that layer ablation of the carbon in a nitrogen atmosphere forms carbon nitride layer 27.

More specifically, as the pulsed excimer laser beam 46 impinges upon rotating target 50, a plume 52 of the target material is formed. One reason that the excimer laser is used in the present invention is that each photon possesses a large energy. For example, a KrF excimer laser produces 5.01 eV per photon at an oscillation wavelength of 248 nm. A $CO_2$ laser, on the other hand, only produces 0.12 eV per photon at an oscillation wavelength of 10.6 um. Another reason for utilizing a laser technique is that the laser beam can be converged with an optical system such as a focusing lens, thereby increasing the energy density. By applying a high energy laser beam on the target, a small area of the target is decomposed to generate excited species (or the "plume") to produce boron n-type nitride film 26 and, subsequently, carbon nitride film 27.

Accordingly, when laser beam 46 strikes the hexagonal boron nitride target/carbon split target 2, plume 52 which is generated consists of either boron nitride related species with the desired dopant ions. When the rotation of target 50 is stopped a laser beam 46 strikes only the carbon half of the target. Carbon nitride related species are formed which, in combination with the nitrogen gas atmosphere, form carbon nitride layer 27. Plume 52 the travels to the heated substrate 40 and forms a deposit. The temperature of substrate 40 should be at least 100° C. and preferably at least 400° C. It is more preferred that the temperature of substrate 40 be in the range between 400° to 500° C.

It is a preferred practice to use at least one bias ring 54 to further energize plume 52 during the deposition process. It is also to be understood that other targets may be suitable or useful in a particular application.

In doping boron nitride layer 26 or carbon nitride layer 27, either a split or composite target of carbon nitride and the dopant, for example carbon, can be provided, or, alternatively, a dopant gas, for example methane in the case of carbon doping, may be utilized. A dopant source gas can be added to the nitrogen atmosphere at a volumetric ratio (carbon source gas-to-nitrogen) of from about 4-1 to about 10-1. Application of the dopant gas will generally be continuous with the deposition process. Other methods of doping may also be suitable.

Bias ring 54 supplies additional energy to the ablation plume 52 and thus more efficiently ionizes nitrogen gas and the ablated species. The increased energy of the plume also increases the surface mobility of the deposited material and thus provides for improved bonding between the layers. The increased nitrogen ionization further reduces any nitrogen deficiency in the layers.

Bias ring 54 is positioned between target 50 and substrate 40 such that plume 52 passes through the ring. When desired, more than one bias ring can be used. The ring is fabricated from a refractory material such as molybdenum, tungsten, or the like and is isolated from the ground by an insulator. The ring is charged to a desired electrical potential, e.g. a few hundred volts, such that it supplies additional energy to the ablation plume and more efficiently ionizes nitrogen gas at near the substrate surface.

The increased energy in the ablation plume also facilitates the mobility of the surface atoms in the deposition layer, forming high-quality carbon nitride if desired. The ionized nitrogen in the plasma helps to maintain the stoichiometry of the carbon nitride film.

In order to obtain an energetically more stable surface of carbon nitride layer 27, it is preferably hydrogen annealed in a plasma deposition chamber. Most preferred is a microwave hydrogen plasma at a frequency of about 2.45 GHz, in a hydrogen atmosphere at a pressure of from about 40 to 60 Torr. The hydrogen anneal will typically be complete in from about 5 minutes to about 2 hours.

Following the hydrogen anneal carbon nitride layer 27, conventional techniques are utilized to form the additional structures, i.e. layer 36, spacers 37 and electrodes 28 and 30.

Another method of fabricating carbon nitride cold cathodes which is provided in the present invention is through the use of sputtering. As will be appreciated by those skilled in the art, sputtering is a well known technique for forming films of materials and is described in the patent literature, for example U.S. Pat. Nos. 4,407,713 and 4,683,043, the entire disclosures of which are incorporated herein by reference.

Figure 3:
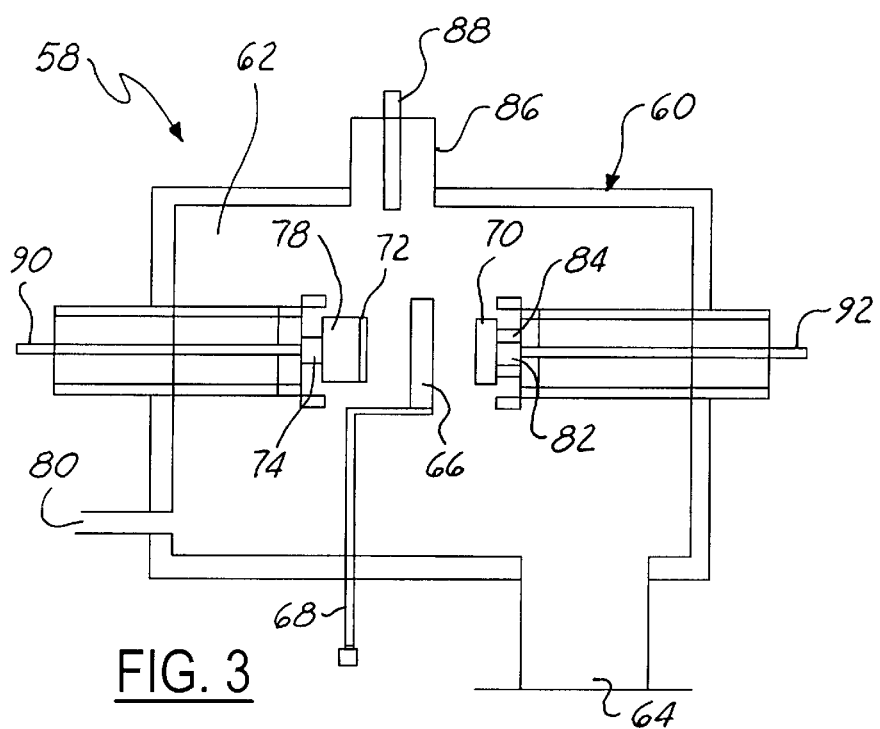
FIG. 3 is a schematic of a reactive magnetron sputter coating apparatus.

More specifically, and referring now to FIG. 3 of the drawings, a sputtering apparatus 58 with casing 60 is shown which consists of a 9-liter aluminum vacuum chamber which may be used with multiple sputtering sources in a horizontal plane. Chamber 62 is evacuated with a vacuum pump which is attached to outlet 64. Base pressures in the range of $10^{-6}$ torr are maintained in chamber 62. A movable shutter 66, actuated for example by rotary device 68, is positioned between the carbon source 70, preferably graphite, and the boron nitride substrate surface 72. Substrate 72 is held by substrate holder 74. Substrate 72 is positioned directly across from carbon source 70. Carbon source 70 is separated from substrate 72 by a suitable distance of from about 4 to 100 centimeters. Substrate heater 78 is positioned between substrate holder 74 and the substrate electrode.

If desired, to provide an n-type dopant, a second sputtering source (not shown) may be used to supply the dopant. The second sputtering source may be positioned so that its orientation is perpendicular to the center line running from carbon source 70 to substrate 72.

Gases are admitted to the chamber through leak valve or port 80 and total gas pressure can be monitored with a manometer. Ultra-high purity (99.999%) gases (principally argon and nitrogen) are used to fill the chamber, preferably at a ratio of about 1 part nitrogen to 4 parts argon, volumetrically.

Both sputtering sources are operated in the magnetron mode. Rare-earth permanent magnets arranged as magnetic array 82 are held in support 84 and are placed behind the sputtering sources in a configuration which produces closed circular magnetic traps with field strengths of from about 500 to 1500 gauss. These magnetic traps increase the source emission rates and allow lower voltages to be applied to the sources. If utilized, the dopant source is operated with a DC power supply and the carbon source is operated with a rf supply (2 kw at 13.56 MHz). The substrate may be rf biased, also using a 2 kw rf power supply operating at 13.56 MHz. Both rf power supplies should be in phase.

Substrate 72 is inserted into sample holder 74 and the holder is in turn inserted into the vacuum chamber through air lock 86 using substrate insertion rod 88. The sample holder is then locked into position in the rf-biased electrode 90. Another electrode 92 is provided for source 70. System base pressure is reduced to below about $5\times10^{-6}$ torr before the sputtering operation begins. Hydrogen is then admitted into the sputtering chamber to a predetermined level and the substrate is then plasma cleaned. Following cleaning, nitrogen/argon replaces the hydrogen to the desired level and the coating deposition is initiated by applying rf power to the water-cooled carbon source. The rf substrate electrode bias is maintained at between 0 and 1,000 volts during deposition. Sputtering continues until a carbon nitride layer of the required thickness is created on substrate 72. The orientation of the layers is again most preferably carbon nitride, n-type boron nitride, n-type diamond and silicon.

Figure 4:
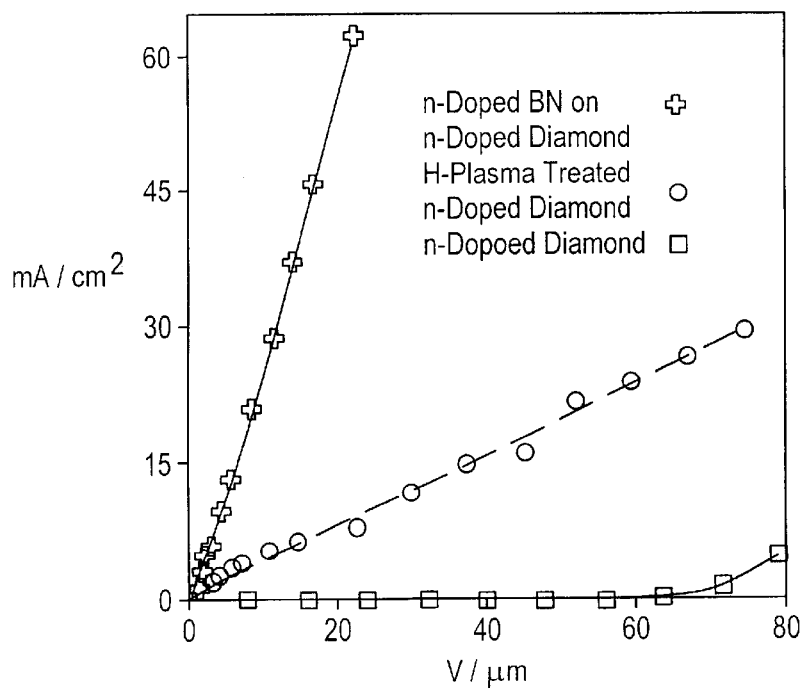
FIG. 4 is a graph illustrating a comparison of the current (mA/cm$^2$) measured in a vacuum diode with an n-type boron nitride cold cathode as a function of the applied field (V/$\mu$M) and for an n-type carbon nitride film grown on n-type boron nitride on n-type diamond on (100) Silicon.
Figure 5:
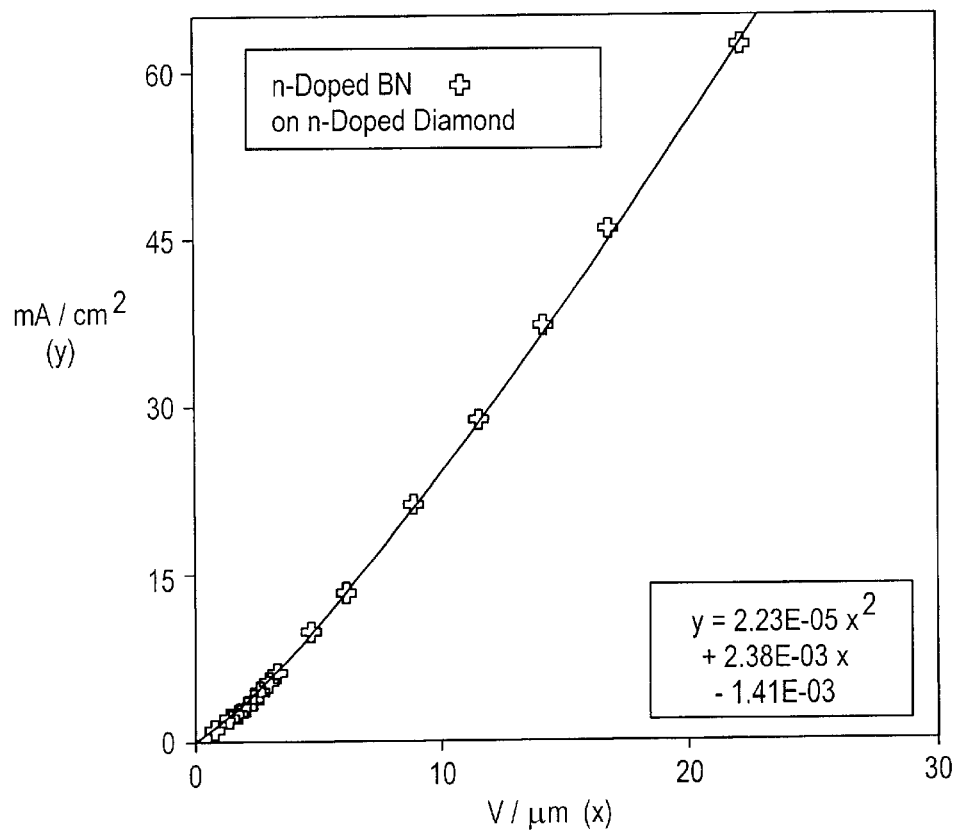

Referring now to FIG. 4 of the drawings, the electron emission of a carbon nitride cathode material made on n-doped boron nitride over n-doped diamond by laser ablation is shown in comparison with n-doped boron nitride. Slightly higher extraction voltages are required for the carbon nitride material.

The following examples are provided to more clearly describe the invention and are in no manner to be deemed limiting on the full scope of the invention.

EXAMPLES

Example I

A suitably cleaned silicon substrate (i.e., a silicon wafer) is positioned inside the chamber of a laser ablation apparatus equipped with a rotating target one-half of which is comprised of hexagonal carbon nitride (hBN) with the other half being carbon. The substrate is heated to a temperature from 20° C. to 750° C. with the preferred temperature being 450° C. A pulsed excimer KrF laser beam operating at 248 nm with $MgF_2$ lenses is focused on the rotating target. Purified gas comprised of one part nitrogen and 4 parts argon are metered into the reaction chamber at about 50 mtorr during the ablation of the target. The films resulting from this process can range from single crystal to amorphous, depending on the exact process conditions and substrate preparation. A thin layer of n-type BN (nominally 3 nm) is deposited by rotating the target. The target is then stopped and the laser beam impinges only on the carbon half of the target. A layer of carbon nitride (nominally 100 nm) is formed on the boron nitride layer.

Example II

A suitably cleaned n-doped polycrystalline diamond coated silicon substrate (i.e. a silicon wafer) was positioned inside the chamber of a reactive laser ablation apparatus equipped with a rotating target that was half comprised of hexagonal boron nitride (hBN) and half comprised of carbon. The substrate was heated to a temperature of 450° C. A pulsed excimer KrF laser beam operating at 248 nm with $MgF_2$ lenses was focused on the rotating target. Purified gas comprised of nitrogen and argon was metered into the reaction chamber at about 50 mtorr during the ablation of the target. The gas composition was nitrogen and argon in a ratio of 1:4. A thin (~3 nm) n-doped BN film was deposited on the n-doped diamond. The rotation of the target was stopped at the carbon half and a conductive CN film (~100 nm) was deposited on the BN film. The sample was removed from the laser ablation system and submitted to an atomic hydrogen plasma for about 1 hour. This sample emitted ~120 mA/cm$^2$ at an extraction field of about 60 V/μm. The current was only limited by the voltage limits of the power supply and the number of carriers injected into the conduction band of the CN by the pressure contact on the cathode side of the device.

Example III

A suitably cleaned substrate (i.e., silicon, diamond coated silicon, molybdenum, tungsten, etc.) is positioned inside the chamber of a DC or RF magnetron sputtering apparatus equipped with a target that is comprised of carbon. The substrate is heated to a temperature from 20 C. to 750 C. with the preferred temperature being 450 C. A few kilowatts of DC or RF power are applied to the magnetron target. Purified gas comprised of 1 part nitrogen and 4 parts argon is metered into the reaction chamber at about 50 mtorr during the sputtering of the target. The ratio of the gases is determined by the desired properties of the final material. The carbon nitride films resulting from this process can range from single crystal to amorphous, depending on the exact process conditions and substrate preparation. The best electron emitters are believed to be those comprised of moderately sized crystals, 0.01 to 5 um.

What is claimed is:

1. An electronic device, comprising:
   a body defining a vacuum space;
   a cathode formed of carbon nitride, said carbon nitride being doped n-type and
   an electrode associated with said carbon nitride cathode;
   wherein a surface of said carbon nitride cathode contacts said vacuum such that electrons are emitted from said cathode into said vacuum space.

2. The electronic device recited in claim 1, wherein said carbon nitride has a morphology selected from the group consisting of amorphous carbon nitride, polycrystalline carbon nitride, single crystal carbon nitride and mixtures thereof.

3. The electronic device recited in claim 1, wherein said carbon nitride is doped n-type with a dopant selected from the group consisting of C, N, Si and P.

4. The electronic device recited in claim 1, wherein said carbon nitride hydrogen annealed.

5. The electronic device recited in claim 2, wherein said carbon nitride is polycrystalline carbon nitride.

6. The cathode recited in claim 1, wherein said carbon nitride is a layer of carbon nitride disposed on a layer of n-type boron nitride.

7. The invention recited in claim 6, wherein n-type boron nitride is disposed on a layer of n-type diamond.

8. The invention recited in claim 7, wherein said n-type diamond layer is disposed on a layer of silicon.

9. The invention recited in claim 8, wherein said layer of silicon is n-type silicon.

10. An electronic device, comprising:
a body defining a vacuum space;
a cathode;
an anode;
an electrode associated with said cathode;
wherein said cathode extends into said vacuum space and is formed of n-type carbon nitride.

11. The electronic device recited in claim 10, wherein said carbon nitride has a morphology selected from the group consisting of amorphous carbon nitride, polycrystalline carbon nitride, single crystal carbon nitride and mixtures thereof.

12. The electronic device recited in claim 10, wherein said carbon nitride is doped n-type with a dopant selected from the group consisting of carbon, lithium, and sulfur.

13. The electronic device recited in claim 10, wherein said carbon nitride is hydrogen annealed.

14. The electronic device recited in claim 10, wherein said carbon nitride is polycrystalline carbon nitride.

15. The electronic device recited in claim 10, wherein said cathode comprises a layer of carbon nitride disposed on a layer of n-type boron nitride.

16. The electronic device recited in claim 15, wherein said layer of n-type boron nitride is disposed on a layer of n-type diamond.

17. The invention recited in claim 10, wherein said electronic device is a microelectronic device.

* * * * *